United States Patent [19]
Stegeman et al.

[11] 3,824,420
[45] July 16, 1974

[54] DEVICE FOR TRANSFORMING A ROTATIONAL MOTION INTO A TRANSLATIONAL MOTION

[75] Inventors: Bernardus Hendrikus Marinus Johannes Stegeman, Amsterdam; Hilrich Jan Matthijs Venker, Heemstede, both of Netherlands

[73] Assignee: Honeywell Bull (Nederland) N.V. (Societe anonyme), Amsterdam, Netherlands

[22] Filed: Apr. 6, 1973

[21] Appl. No.: 348,600

Related U.S. Application Data

[63] Continuation of Ser. No. 119,976, March 1, 1971, abandoned.

[52] U.S. Cl. ............... 310/89, 74/424.8 R, 310/15, 310/80, 310/103, 310/12, 310/266
[51] Int. Cl. ............................................... H02k 7/06
[58] Field of Search ......... 310/97, 99, 103, 104, 14, 310/15, 23, 80, 83, 84, 155, 166, 12, 266; 74/DIG. 4, 22 A, 424.8 R, 210, 409

[56] References Cited
UNITED STATES PATENTS

| 1,043,573 | 11/1912 | Keller et al. | 310/103 X |
| 1,562,730 | 11/1925 | Andrews | 310/103 X |
| 2,371,511 | 3/1945 | Faus | 310/97 X |
| 3,219,853 | 11/1965 | Schreiber | 310/14 |
| 3,231,769 | 1/1966 | Trechsel | 310/15 X |
| 3,483,412 | 12/1969 | Bakker et al. | 310/103 |
| 3,760,205 | 9/1973 | Imris | 310/266 X |
| 3,777,587 | 12/1973 | Hoshina et al. | 310/80 X |

FOREIGN PATENTS OR APPLICATIONS

| 228,104 | 1/1969 | U.S.S.R. | 310/12 |

*Primary Examiner*—Mark O. Budd
*Attorney, Agent, or Firm*—Baldwin, Wight and Brown

[57] ABSTRACT

A motion transforming device wherein selectively energizable magnetic coupling is provided between the threads of a screw and a nut engaged therewith.

27 Claims, 8 Drawing Figures

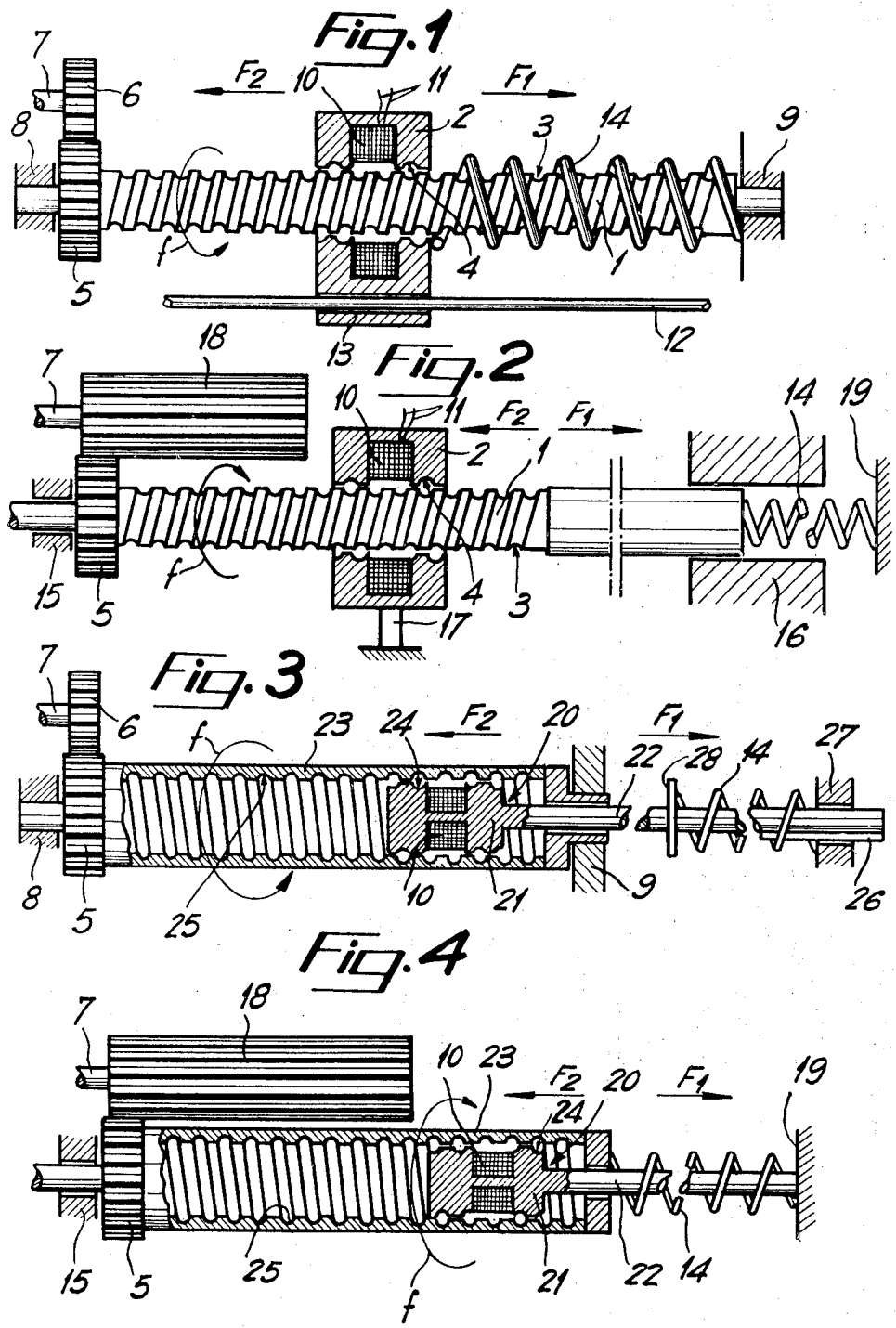

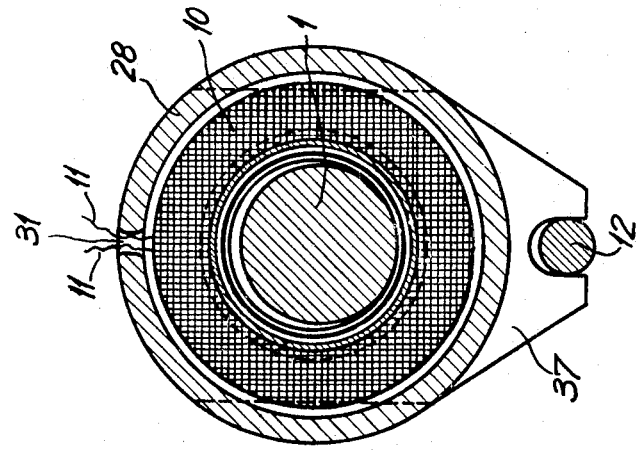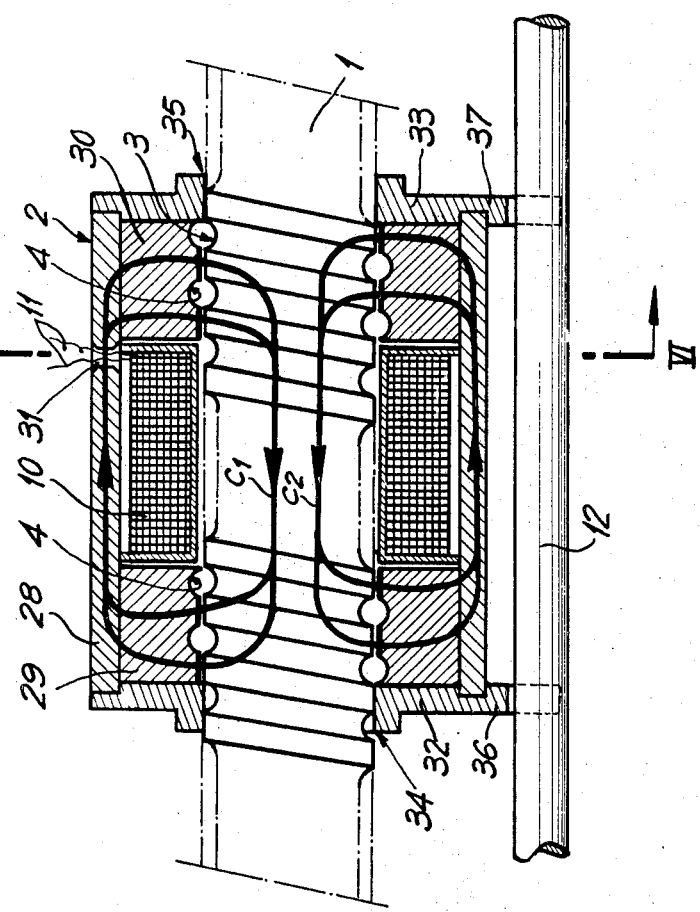

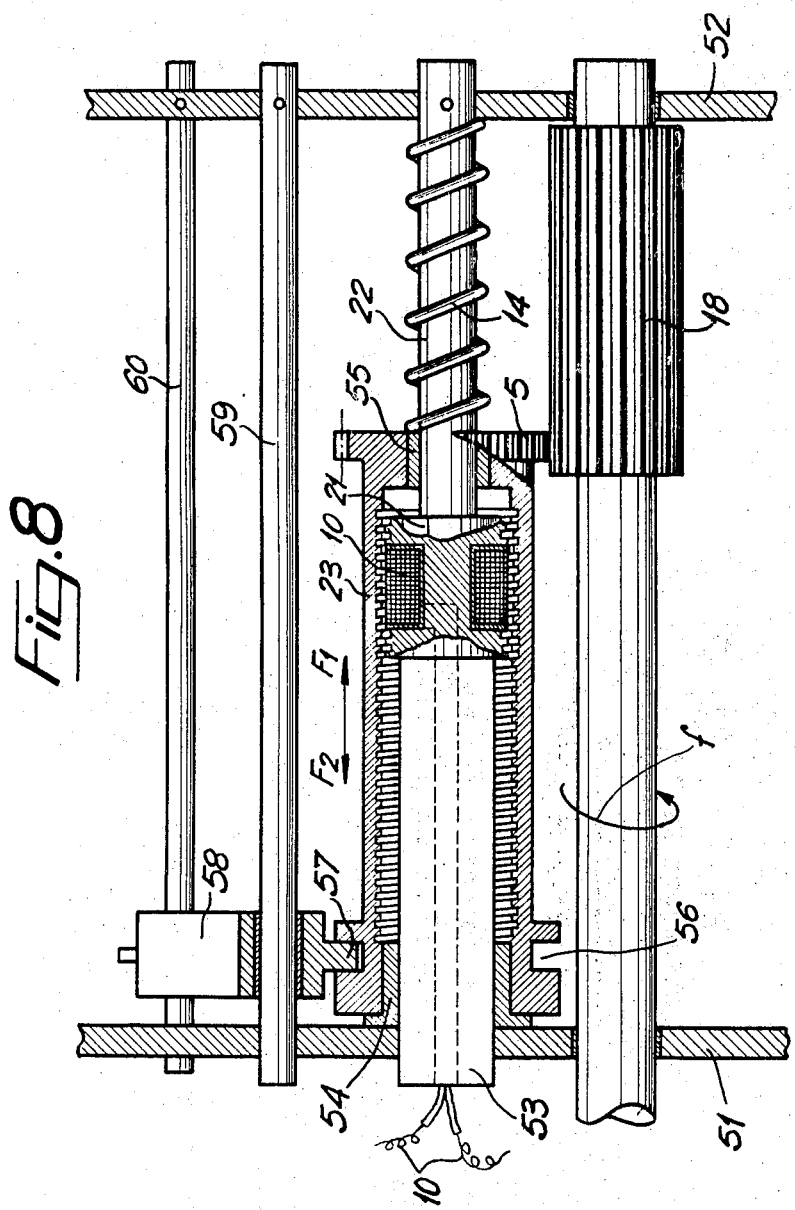

DEVICE FOR TRANSFORMING A ROTATIONAL MOTION INTO A TRANSLATIONAL MOTION

RELATED APPLICATIONS

This application is a continuation of U.S. Pat. Ser. No. 119,976, filed Mar. 1, 1971, now abandoned.

BACKGROUND OF THE INVENTION

The instant invention relates to a device for transforming a rotational motion into a translational motion.

Known devices of this type consists of a screw and a threaded knot, mechanically engaged one inside the other, the nut being prevented from turning in order that it can move in translation.

Such devices are utilized particularly in series printers, i.e., printers in which a striking mechanism is moved linearly to pass in front of a plurality of printing positions, where it imprints symbols or characters, in order to provide a line of printing. In such an application, the striking mechanism is affixed to the nut for translation.

These known devices using screw and nut, present a number of disadvantages. For example, when the nut reaches the end of the screw it is necessary that it be returned to the beginning of the screw in order to permit the printing of the following print line. Since the screw and the nut are mechanically engaged, it is necessary either to reverse the sense of rotation of the screw, which entails a serious loss of time, or to provide a nut consisting of at least two removable parts opening in the manner of the jaws of a clamp for disengaging from the screw, which requires complicated techniques. Thus, with these known devices the return of the nut is slow and complicated to achieve.

Moreover, with a device of this type, it is virtually impossible to rapidly halt the nut in a particular position. In fact, in order to stop the movement of the nut it is necessary to stop the rotation of the screw, which, because of the relatively great inertia of the screw and of its driving apparatus, cannot be effected in a very short time.

It is the object of the present invention to remedy these disadvantages.

SUMMARY OF THE INVENTION

According to the invention, a device for transforming a rotational motion into a translational motion comprises a male element engaged in at least one female element and substantially coaxial to the latter. These two elements are provided with threads of the same pitch and of the same sense on their opposed walls, and are caused to have a relative rotational motion between them when one of the elements is prevented from turning in order that it be displaced relative to the other. Such device is characterized, on one hand, in that the male and female elements are at least partially of a magnetic material, the external diameter of the thread of the male element being less than the smallest diameter between crests of thread of the female element and, on the other hand, in that it comprises magnetic means for generating a flux closing through the two elements.

Accordingly, when the magnetic means generates a magnetic flux, the two magnetic elements tend to arrange themselves in relation to each other in such a manner that the air-gap existing between them has the minimum value, which corresponds to the relative positions of the two elements for which the crests of the male and female threads are facing.

Consequently, if in one of these positions of equilibrium one of the elements turned the forces generated by the magnetic flux tend to maintain this equilibrium, so that one of said elements will be urged to slide relative to the other.

In order to improve the stability of these equilibrium positions, the threads of the male and female elements advantageously exhibit predominately flat crests. Thus, the crests of opposing threads can be broad and assure said stability.

Preferably, the magnetic means is formed of a coil carried by the element which is held from turning. The male and female elements can be of mild steel or, possibly, of a material with high magnetic permeability and high ohmic resistance, such as that known commercially under the name of "Ferroxcube."

Preferably, the device of the instant invention comprises an elastic restoring means, which is stressed by the movable translation element as it slides relative to the other element. Consequently, when the current supplied to the coil is cut off the magnetic flux and the force which it generates ceases instantaneously, and the movable translation element may be returned very rapidly to its original position since it is no longer constrained in sliding relative to the other element. If, once again, current is supplied to the coil, the movable translation element moves once more against the elastic means under the action of the magnetic force generated by the coil.

Advantageously, the pitch of the threads of the male and female elements is sufficiently small so that, when current is supplied to the coil, these elements reach a equilibrium position almost instantaneously, without the movable translation element having to move a long distance to reach the first possible equilibrium position.

BRIEF DESCRIPTION OF THE DRAWING

The invention will be described with reference to the accompanying drawing, wherein:

FIGS. 1 – 4 show schematically four modes of realization of the invention;

FIG. 5 shows additional detail in the device of FIG. 1;

FIG. 6 is a cross-sectional view taken along line VI—VI of FIG. 5;

FIG. 8 illustrates the application of the device of FIG. 4 to a series printer.

In these figures, the various elements which correspond bear the same reference numeral.

DESCRIPTION OF THE PREFERRED EMBODIMENT

Figure 7:
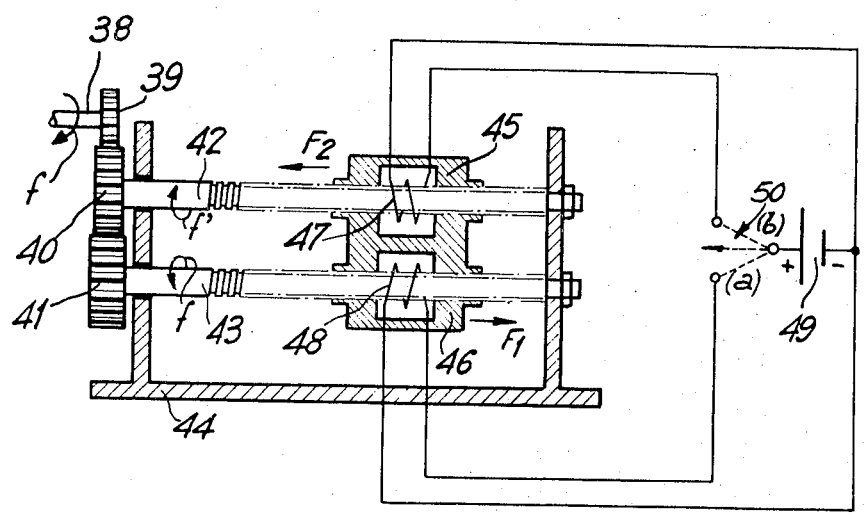
FIG. 7 shows an embodiment based on those of FIGS. 1 and 5, adapted for transforming rotational motion into two translational motions of opposite sense.

The device of the instant invention, shown in FIG. 1 comprises a male element 1, in the form of a screw, traversing a female element 2, in the form of a nut. The external surface of screw 1 and the internal surface of nut 2, opposite to said screw, bear threads 3 and 4 respectively, threads 3 and 4 being of the same pitch, of the same sense, and having flat crests.

The external diameter of the thread of screw 1 is less than the smallest diameter between crests of the thread of nut 2, such that, when nut 2 is centered on screw 1 it can slide freely in relation to screw 1.

Screw 1 and nut 2 are of a magnetic material, such as iron, mild steel, "Ferroxcube," etc.

At one of its ends, screw 1 is attached to a gear 5, which meshes with a gear 6 driven by a shaft 7. Screw 1 is disposed to turn in bearings 8 and 9, which prevent longitudinal slip.

Nut 2 bears a coil 10, which encircles screw 1 and is adapted to be supplied current through wires 11. Moreover, nut 2 is prevented from turning by a guide shaft 12, disposed parallel to screw 1 and traversing a bore 13 in nut 2.

Thus, screw 1 can turn on its longitudinal axis (arrow $f$), but it cannot slide. Conversely, nut 2 can slide parallel to the axis of screw 1, but it cannot turn on such axis.

When current is then supplied to coil 10, a magnetic field is set up, the lines of force of this magnetic field closing through nut 2 and screw 1. As a consequence, nut 2 is subjected to a magnetic force tending to move the nut so that the air-gap existing between nut 2 and screw 1 is a minimum. This is achieved when the crests of thread 4 of nut 2 are disposed exactly opposite to the crests of thread 3 of screw 1. Nut 2 is then in a position of equilibrium. If, then, shaft 7 turns screw 1, the electromagnetic forces operate in such a manner that this equilibrium position is conserved, whereby as thread 3 twists in relation to nut 2, the latter moves in the direction of arrow $F_1$ (toward the right in FIG. 1), the crests of thread 4 remaining opposite to the crests of thread 3.

In the device of FIG. 1, a helicoidal compression spring 14 encircles screw 1 and is disposed between nut 2 and a fixed bearing 9. Thus, when nut 2 progresses in the direction of arrow $F_1$ under the action of the electromagnetic forces generated by coil 10, it compresses spring 14.

When the current supplied to coil 10 is cut off nut 2 stops instantaneously, and then, urged by the thrust of released spring 14, nut 2 slides in the direction of arrow $F_2$ and is speedily restored to its initial position.

Thus, nut 2 can slide parallel to the axis of screw 1 in the two opposed directions $F_1$ and $F_2$.

FIG. 2 shows a variation of the device of FIG. 1. The device of FIG. 2 comprises screw 1, its thread 3 and gear 5, nut 2, its thread 4 and coil 10, as well as motor shaft 7.

However, in this mode of realization, screw 1 can slide longitudinally in its end bearings 15 and 16, whereas nut 2 is held from rotation and translation by a holding member 17. In addition, gear 5 cooperates with a fluted drum 18, which is driven by shaft 7.

When shaft 7 turns screw 1 (arrow f) and coil 10 has current supplied thereto, electromagnetic forces are setup, as described previously, which forces tend to displace screw 1 in the direction of arrow F, against the action of a spring 14 disposed between screw 1 and a fixed wall 19. When the current supplied to coil 10 is cut off, screw 1 is restored to its initial position by spring 14 (arrow $F_2$).

The variations of the mode of realization shown in FIGS. 3 and 4 comprise a male element 20 provided with a magnetic core 21 threaded externally and affixed to a shaft 22. These devices also comprise a magnetic female element 23 threaded internally. Thread 24 of core 21 and thread 25 of element 23 are of the same pitch, of the same sense, and have flat crests.

Core 21, which bears a coil 10, is centered relative to the interior of element 23, and shaft 22 extends externally of element 23.

Female element 23 is attached to a gear 5 at one of its ends.

In a device of FIG. 3, gear 5 meshes with a gear 6 that is turned by a shaft 7. Thus, female element 23 can turn, but cannot slide longitudinally in bearings 8 and 9. Conversely, male element 20 can slide longitudinally, but cannot turn because of a rib 26 that cooperates with a channel of corresponding form provided in a fixed wall 27.

When the tubular element 23 turns in the direction of arrow $f$, under the action of shaft 7, and coil 10 has current supplied thereto, in a manner similar to that described above, core 21 and its shaft 22 are displaced in the direction of arrow $F_1$. When moving in a direction of arrow $f_1$, shaft 22 moves against the action of a spring 14 disposed between a disc 28, attached to shaft 22, and fixed wall 27. When the current supplied to coil 10 is cut off, core 21 returns to its initial position (arrow $F_2$) under the thrust of spring 14.

In a device of FIG. 4, gear 5 meshes with a fluted drum 18, which is turned by shaft 7. Thus, female element 23 can turn and slide longitudinally in bearing 15 and on shaft 22. Conversely, male element 20 is rigidly attached to a fixed wall 19.

When tubular element 23 turns in the direction of arrow $f$, under the action of shaft 7, and coil 10 has current supplied thereto, in a manner similar to that described above, tubular element 23 is displaced in the direction of arrow $F_1$ against the action of a spring 14 disposed between female element 23 and fixed wall 19. Similarly, when the current supplied to coil 10 is cut off, spring 14 restores tubular element 23 to its original position.

The device shown in detail in FIGS. 5 and 6 of the type shown in FIG. 1. Such device comprises a male element in the form of a screw 1 and a female element 2 in the general form of a nut.

Female element 2 comprises a tubular magnetic yoke 28 in which are lodged magnetic nuts 29 and 30, on each side of an annular coil 10. Nut 29 may be pressed into yoke 28, whereas nut 30 is inserted with light friction and fastened to yoke 28 by means of screws, for example. Thus, it is possible to disassemble the structure to replace coil 10, in case this is required. Coil 10 is supplied current through wires 11, which enter yoke 28 through a hole 31.

Nuts 29 and 30 bear a thread 4 corresponding to a thread 3 of screw 1. The spacing between nuts 29 and 30 is such that the crests of their threads can be placed opposite to the crests of thread 3.

Tubular yoke 28 of female element 2 is closed at each end by non-magnetic slide plates 32 and 33, for example of bronze. Plates 32 and 33 are provided with respective central openings 34 and 35, which permit centering female element 2 relative to screw 1, the diameters of openings 34 and 35 being such that female element 2 can slide on screw 1 with light friction.

In addition, slide plates 32 and 33 comprise extensions 36 and 37 in the form of forks, which engage a guide shaft 12 disposed parallel to screw 1.

In FIG. 5 the magnetic field lines $C_1$ and $C_2$ are shown as passing through male and female elements 1 and 2 when coil 10 is energized, elements 1 and 2 being shown in one of their equilibrium positions.

Clearly, in all of the preceding examples, the sense of displacement of the movable translating part depends on the sense of rotation of the movable rotating part, as well as the sense of the threads of the male and female elements. This fact had been taken advantage of in the arrangement of FIG. 7 to provide a device adapted for sliding in two opposite directions from a single rotational motion.

To this end, the device of FIG. 7 comprises a shaft 38 turning in the direction of arrow $f$. Shaft 38 is attached to a gear 39 meshing with a gear 40, which, in turn, meshes with another gear 41. Each of gears 40 and 41 is attached to a respective one of screws 42 and 43. Screws 42 and 43 are parallel and are supported to turn in a frame 44. Thus, screw 43 turns in the direction of arrow $f$ and screw 42 in the opposite direction, arrow $f^1$. Screw 42 and 43 have threads of the same sense and traverse respective nuts 45 and 46, of the type shown in FIG. 5. Nuts 45 and 46 are integral, forming only a single female element 45, 46.

The device of FIG. 7 further comprises two coils 47 and 48, associated respectively with screws 42 and 43.

Coils 47 and 48 can be alternatively supplied from a single voltage source 49 through an intermediate switch 50 having two positions ($a$) and ($b$).

When switch 50 is in position ($a$), coil 48 is energized and nut 45, 46 is displaced in the direction of arrow $F_1$ (toward the right in FIG. 7). When switch 50 is transferred from position ($a$) to position ($b$), the nut 45, 46 stops and then responds in the direction opposite (arrow $F_2$) to its preceding displacement.

According to one variation in construction, the mechanism of FIG. 7 can be implemented so that the velocity in one of the two directions of translation differs from the velocity in the other direction of translation. This feature is advantageous in the instance of a printer when it is desired to assure a rapid return of the striking module, without utilizing a spring as described previously.

For example if it is desired that female element 45, 46 have a return velocity to the beginning of the line that is five times its velocity of translation during printing, it is sufficient that the number of teeth of gears 40 and 41 be in the ratio of 5:1.

Another advantage of such mechanism being without a return spring is that the translation motion can be halted at any desired location along the print line simply by returning switch 50 to a median or neutral position. Then, the printing can be resumed, or the striking module returned, according to whether switch 50 is moved to position ($a$) or ($b$).

The device shown in detail in FIG. 8 is of the type shown in FIG. 4, and demonstrates the application of the device of the instant invention to a series printer.

The device of FIG. 8 comprises a threaded magnetic core 21 held between two fixed side plates 51 and 52 by the intermediary of shafts 22 and 53. Shaft 53 is hollow to permit passage of supply wires 11 to a coil 10 borne by core 21. In addition, this device comprises a magnetic female element 23, threaded internally, and adapted for turning about core 21 and centered relative thereto by means of bearings 54 and 55. Bearings 54 and 55 permit female element 23 to slide and turn relative to male element 21, 22, 53. In order to be able to be driven in rotation, female element 23 is attached to a gear 5 meshing with a fluted shaft 18, which can be driven to turn in side plates 51 and 52, for example in the direction of arrow $f$. A spring 14 is provided between female element 23 and side plate 52.

This spring, which has been described above, is that which female element 23 compresses while turning on its axis and sliding in the direction of arrow $F_1$, and which restores female element 23 to its original position (in the direction of arrow $F_2$).

Movable element 23 is provided with a groove 56, which is engaged by a stem 57 of a striking mechanism 58 of a series printer of known type. This striking mechanism is guided for translation by guide shafts 59 and 60, which are fixed between side plates 51 and 52. Thus, with the device of the instant invention, the striking mechanism can be displaced during the printing of a line in the direction of arrow $F_1$, and can be returned at the end of each line by spring 14.

Because much that has been described in the foregoing and represented in the drawing is characteristic of the invention, it is evident that one skilled in the art can adduce all modifications of form and detail deemed useful without departing from the scope of the invention.

We claim:

1. In a device for transforming a rotational motion into a translational motion, wherein a male element engages in at least one female and is substantially coaxial with said female element, said male and female elements being provided with flat crested threads of the same pitch and of the same sense on their opposed walls and being caused to have a relative rotational motion therebetween when one of said elements is prevented from turning in order that it be displaced relative to the other, the improvement comprising:
    said male and female elements being formed at least partially of magnetic material, the external diameter of the thread of said male element being less than the smallest diameter between crests of the thread of said female element, said one element prevented from rotating having a central annular recess separating into two portions the threads of that member, and
    a single energizing winding in said recess for generating a flux closing through said male and female elements.

2. The device of claim 1, further comprising elastic restoring means stressed by the movable translation element when it slides relative to the other element.

3. The device of claim 1, wherein threads of said male and female elements have dimensions such that, when said coil is energized, the movable translation element almost instantaneously reaches a position in which the crests of its thread are disposed opposite the crests of the thread of the other element.

4. The device of claim 1, wherein said female element has the form of a nut and is traversed by said male element, said male element being in the form of a screw, wherein said nut is prevented from turning but not from translating, and wherein said screw can be turned but is prevented from longitudinal translation.

5. The device of claim 1, wherein said female element has the form of a nut and is traversed by said male element, said male element being in the form of a screw, wherein said nut is prevented from turning and from translating, and wherein said screw can be turned and can slide in longitudinal translation.

6. The device of claim 1, wherein said female element is a tubular sleeve having an internal thread, wherein a male element comprising a threaded magnetic core is inserted in said sleeve, wherein said core is prevented from turning but not from translating, and wherein said sleeve can be turned on its axis but is prevented from longitudinal translation.

7. The device of claim 1, wherein said female element is a tubular sleeve having an internal thread, wherein a male element comprising a threaded magnetic core is inserted in said sleeve, wherein said core is prevented from turning and from translating, and wherein said sleeve can be turned and can slide in longitudinal translation.

8. The device of claim 1, comprising an additional like male element and an additional like female element bearing, said female elements being joined together, and an additional coil, said two coils being alternatively supplied with current, one coil being associated with one direction of translation of the two joined female elements and the other coil being associated with the opposite direction.

9. The device of claim 1, wherein said female element comprises a tubular magnetic yoke in which are mounted two half-nuts, one on each side of a coil, said yoke being closed at its ends by non-magnetic side plates provided with openings traversed by said male element by which said female element can be entered and can slide with light friction relative to said male element.

10. The device of claim 9, wherein said side plates comprise extensions cooperating with a guide shaft disposed parallel to said male element for preventing said female element from turning.

11. The device of claim 8, wherein said two male elements have threads of the same sense and are turned in opposite directions.

12. The device of claim 2, wherein said female element has the form of a nut and is traversed by said male element, said male element being in the form of a screw, wherein said nut is prevented from turning but not from translating, and wherein said screw can be turned but is prevented from longitudinal translation.

13. The device of claim 2, wherein said female element has the form of a nut and is traversed by said male element, said male element being in the form of a screw, wherein said nut is prevented from turning and from translating, and wherein said screw can be turned and can slide in longitudinal translation.

14. The device of claim 2, wherein said female element is a tubular sleeve having an internal thread, wherein a male element comprising a threaded magnetic core is inserted in said sleeve, wherein said core is prevented from turning but not from translating, and wherein said sleeve can be turned on its axis but is prevented from longitudinal translation.

15. The device of claim 2, wherein said female element is a tubular sleeve having an internal thread, wherein a male element comprising a threaded magnetic core is inserted in said sleeve, wherein said core is prevented from turning and from translating, and wherein said sleeve can be turned and can slide in longitudinal translation.

16. A device for transforming a rotational motion into a translational motion, comprising:
   A first element having cylindrical outer surface and bearing a first thread on said outer surface,
   a second element having a cylindrical inner surface and a bearing a second thread on said inner surface,
   said first and second threads having the same pitch, the outer diameter of said first thread being less than the inner diameter of said second thread,
   said first and second elements being formed at least partially of magnetic materials,
   said first element being at least partially disposed inside said second element such that said first and second threads are opposed,
   turning means for turning one of said elements about the central axis of the respective cylindrical surface thereof,
   restraining means for restraining the other one of said elements from turning,
   supporting means for supporting said first and second elements to enable one of said elements to move relative to the other in a direction substantially parallel to said central axis,
   one only of said male and female elements having a central annular recess separating the thread thereof into two spaced portions, a single energizing winding in said central recess for generating a magnetic field linking at least said first and second thread, and
   control means for selectively energizing said winding.

17. The device of claim 16, wherein said turning means turns said first element, said restraining means restrains said second element, and said supporting means supports said second element to move parallel to said axis.

18. The device of claim 16, wherein said turning means turns said first element, said restraining means restrains said second element, and said supporting means supports said first element to move parallel to said axis.

19. The device of claim 16, wherein said turning means turns said second element, said restraining means restrains said first element, and said supporting means supports said first element to move parallel to said axis.

20. The device of claim 16, wherein said turning means turns said second element, said restraining means restrains said first element, and said supporting means supports said second element to move parallel to said axis.

21. The device of claim 16, wherein said control means energizes said winding to provide movement of one of said elements relative to the other in a first direction parallel to said axis and deenergizes said winding when said movement in said first direction is to cease.

22. The device of claim 21, further including means to provide movement of one of said elements relative to the other in a second direction opposite to said first direction when said winding is deenergized.

23. A gearing apparatus for transforming a rotational movement into a translational movement comprising:

a male element, a female element both made of a ferrous metal and being provided with flat-crested helicoidal threads of same sense and pitch on their external and internal diameters respectively, guiding means connected to said male element and said female element for maintaining said male element coaxial with said female element for preventing any rotational movement of said female element, and for preventing any axial displacement of said male element, driving means for rotating said male element, said female element being provided with an annular internal cavity separating in two substantially equal portions the threads of said female element, and one winding wound coaxially into said cavity and energized to generate a magnetic flux which closes through the threads of said male and female elements.

24. A gearing apparatus according to claim 23, further comprising elastic restoring means connected to said female element for stressing thereby when said female element slides relative to said male element.

25. A gearing apparatus for transforming a rotational movement into a translational movement comprising a female element made of ferrous metal having a bore with an internal helicoidal threading with flat crests, a fixed male element made of ferrous metal having a core section provided with an external flat-crested helicoidal threading with same sense and pitch as that of said female element, said core section being fitted with a single annular cavity separating the threads of said core section in two sections of substantially equal lengths, a coil winding wound coaxially into said cavity and energized to generate a magnetic flux closing through the threads of said core sections and of said female element, and driving means for rotating said female element while permitting axial displacement thereof, and guiding means connected to said male element and said female element for maintaining said male element coaxial with said female element, for permitting rotation and axial displacement of said female element, and for preventing rotation of said male element.

26. A gearing apparatus as claimed in claim 25, further comprising elastic restoring means connected to said female element for stressing thereby when said female element slides relative to said male element.

27. A bearing apparatus for transforming a rotational movement into translational movements, comprising: two screw members made of ferrous metal each with identical external helicoidal threading with flat crests, driving means for rotating said screw members in opposite directions of rotation, guiding means for maintaining both of said screw members in parallel relation and for preventing their axial displacement, a female element made of ferrous metal provided with two bores into which said screw members are engaged without rubbing, each of said bores being fitted with internal threading similar to that of the corresponding screw member and with an annular cavity disposed to separate the threads of said bore into two sections of substantially equal lengths, a coil winding wound coaxially into each of the said cavities of said female element, and switching means for selectively energizing either of said windings to cause axial displacement in either of two opposite directions of said femal element by generating a magnetic flux which closes through the threads of the corresponding bore and screw member.

* * * * *